US008510255B2

(12) United States Patent
Fadell et al.

(10) Patent No.: US 8,510,255 B2
(45) Date of Patent: Aug. 13, 2013

(54) OCCUPANCY PATTERN DETECTION, ESTIMATION AND PREDICTION

(75) Inventors: Anthony Michael Fadell, Portola Valley, CA (US); Matthew Lee Rogers, Los Gatos, CA (US); Kipp Avery Rogers, Chicago, IL (US); Abraham K. Ishihara, Palo Alto, CA (US); Shahar Ben-Menahem, Mountain View, CA (US); Rangoli Sharan, Sunnyvale, CA (US)

(73) Assignee: Nest Labs, Inc., Palo Alto, CA (US)

(*) Notice: Subject to any disclaimer, the term of this patent is extended or adjusted under 35 U.S.C. 154(b) by 456 days.

(21) Appl. No.: 12/881,430

(22) Filed: Sep. 14, 2010

(65) Prior Publication Data

US 2012/0066168 A1 Mar. 15, 2012

(51) Int. Cl.
*G06F 9/44* (2006.01)
*G06N 7/02* (2006.01)
*G06N 7/04* (2006.01)

(52) U.S. Cl.
USPC .......................................................... 706/52

(58) Field of Classification Search
None
See application file for complete search history.

(56) References Cited

U.S. PATENT DOCUMENTS

| | | | |
|---|---|---|---|
| 4,223,831 A | 9/1980 | Szarka | |
| 4,335,847 A | 6/1982 | Levine | |
| 4,408,711 A | 10/1983 | Levine | |
| 4,615,380 A | 10/1986 | Beckey | |
| 4,674,027 A | 6/1987 | Beckey | |
| 4,685,614 A | 8/1987 | Levine | |
| 4,751,961 A | 6/1988 | Levine et al. | |
| 5,088,645 A | 2/1992 | Bell | |
| 5,211,332 A | 5/1993 | Adams | |
| 5,240,178 A | 8/1993 | Dewolf et al. | |
| 5,395,042 A | 3/1995 | Riley et al. | |
| 5,476,221 A | 12/1995 | Seymour | |
| 5,499,196 A | 3/1996 | Pacheco | |
| 5,555,927 A | 9/1996 | Shah | |
| 5,611,484 A | 3/1997 | Uhrich | |
| 5,902,183 A | 5/1999 | D'Souza | |
| 5,909,378 A | 6/1999 | De Milleville | |

(Continued)

FOREIGN PATENT DOCUMENTS

| | | |
|---|---|---|
| CA | 2202008 C | 2/2000 |
| EP | 0196069 B1 | 12/1991 |
| JP | S59-106311 A | 6/1984 |
| JP | H1-252850 A | 10/1989 |

OTHER PUBLICATIONS

Akhlaghinia et al. Occupancy Monitoring in Intelligent Environment through Integrated Wireless Localizing Agents, IEEE, 2009, pp. 7.*

(Continued)

*Primary Examiner* — Li-Wu Chang
(74) *Attorney, Agent, or Firm* — Kilpatrick Townsend & Stockton LLP

(57) ABSTRACT

Systems and methods are described for predicting and/or detecting occupancy of an enclosure, such as a dwelling or other building, which can be used for a number of applications. An a priori stochastic model of occupancy patterns based on information of the enclosure and/or the expected occupants of the enclosure is used to pre-seed an occupancy prediction engine. Along with data from an occupancy sensor, the occupancy prediction engine predicts future occupancy of the enclosure. Various systems and methods for detecting occupancy of an enclosure, such as a dwelling, are also described.

46 Claims, 5 Drawing Sheets

(56) References Cited

U.S. PATENT DOCUMENTS

| | | | |
|---|---|---|---|
| 5,977,964 | A | 11/1999 | Williams et al. |
| 6,062,482 | A | 5/2000 | Gauthier et al. |
| 6,098,893 | A | 8/2000 | Berglund et al. |
| 6,216,956 | B1 | 4/2001 | Ehlers et al. |
| 6,222,191 | B1* | 4/2001 | Myron et al. ............... 250/353 |
| 6,349,883 | B1 | 2/2002 | Simmons et al. |
| 6,356,204 | B1 | 3/2002 | Guindi et al. |
| 6,645,066 | B2 | 11/2003 | Gutta et al. |
| 6,769,482 | B2 | 8/2004 | Wagner et al. |
| 7,024,336 | B2 | 4/2006 | Salsbury et al. |
| RE40,437 | E | 7/2008 | Rosen |
| 7,469,550 | B2 | 12/2008 | Chapman, Jr. et al. |
| 7,644,869 | B2 | 1/2010 | Hoglund et al. |
| 7,702,424 | B2 | 4/2010 | Cannon et al. |
| 7,784,704 | B2 | 8/2010 | Harter |
| 7,802,618 | B2 | 9/2010 | Simon et al. |
| 7,848,900 | B2 | 12/2010 | Steinberg et al. |
| 7,854,389 | B2 | 12/2010 | Ahmed |
| 8,010,237 | B2 | 8/2011 | Cheung et al. |
| 8,019,567 | B2 | 9/2011 | Steinberg et al. |
| 8,090,477 | B1 | 1/2012 | Steinberg |
| 8,131,497 | B2 | 3/2012 | Steinberg et al. |
| 8,180,492 | B2 | 5/2012 | Steinberg |
| 2004/0249479 | A1 | 12/2004 | Shorrock |
| 2005/0128067 | A1 | 6/2005 | Zakrewski |
| 2005/0189429 | A1 | 9/2005 | Breeden |
| 2005/0280421 | A1 | 12/2005 | Yomoda et al. |
| 2006/0186214 | A1* | 8/2006 | Simon et al. ............... 236/1 C |
| 2006/0196953 | A1 | 9/2006 | Simon et al. |
| 2008/0015742 | A1 | 1/2008 | Kulyk et al. |
| 2008/0191045 | A1 | 8/2008 | Harter |
| 2008/0223136 | A1* | 9/2008 | Yakabe et al. ............... 73/587 |
| 2008/0317292 | A1 | 12/2008 | Baker et al. |
| 2009/0171862 | A1 | 7/2009 | Harrod et al. |
| 2009/0254225 | A1 | 10/2009 | Boucher et al. |
| 2009/0259713 | A1 | 10/2009 | Blumrich et al. |
| 2009/0271042 | A1* | 10/2009 | Voysey ............... 700/275 |
| 2010/0019051 | A1 | 1/2010 | Rosen |
| 2010/0025483 | A1 | 2/2010 | Hoeynck et al. |
| 2010/0052576 | A1* | 3/2010 | Steiner et al. ............... 315/361 |
| 2010/0070084 | A1 | 3/2010 | Steinberg et al. |
| 2010/0070086 | A1 | 3/2010 | Harrod et al. |
| 2010/0070234 | A1 | 3/2010 | Steinberg et al. |
| 2010/0084482 | A1 | 4/2010 | Kennedy et al. |
| 2010/0211224 | A1 | 8/2010 | Keeling et al. |
| 2010/0262298 | A1 | 10/2010 | Johnson et al. |
| 2010/0262299 | A1 | 10/2010 | Cheung et al. |
| 2010/0280667 | A1 | 11/2010 | Steinberg |
| 2010/0289643 | A1 | 11/2010 | Trundle et al. |
| 2010/0308119 | A1 | 12/2010 | Steinberg et al. |
| 2010/0318227 | A1 | 12/2010 | Steinberg et al. |
| 2010/0324437 | A1* | 12/2010 | Freeman et al. ............... 600/529 |
| 2010/0327766 | A1* | 12/2010 | Recker et al. ............... 315/291 |
| 2011/0046792 | A1 | 2/2011 | Imes et al. |
| 2011/0046805 | A1 | 2/2011 | Bedros et al. |
| 2011/0046806 | A1 | 2/2011 | Nagel et al. |
| 2011/0077896 | A1 | 3/2011 | Steinberg et al. |
| 2011/0185895 | A1 | 8/2011 | Freen |
| 2011/0288905 | A1* | 11/2011 | Mrakas ............... 705/7.25 |
| 2011/0307103 | A1 | 12/2011 | Cheung et al. |
| 2012/0065935 | A1 | 3/2012 | Steinberg et al. |
| 2012/0085831 | A1 | 4/2012 | Kopp |
| 2012/0158350 | A1 | 6/2012 | Steinberg et al. |
| 2012/0221151 | A1 | 8/2012 | Steinberg |

OTHER PUBLICATIONS

Cisco, "Wi-Fi Based Real-Time Location Tracking: Solutions and Technology", 2006, pp. 6 http://www.intermec.com/public-files/white papers/en/CISCO_LocationTracking_wp_web.pdf.*

Mozer et al. "The Neurothermostat: Predictive Optimal Control of Residential Heating Systems", Adv. in Neural Info. Proc. Sys. 9, 1997, pp. 953-959.*

Erickson, et al., "Energy Efficient Building Environment Control Strategies Using Real-Time Occupancy Measurements", ACM Workshop on Embedded Sensing Systems for Energy-Efficiency in Buildings, 2009, pp. 19-24.*

Allen, R., et al., "Real-Time Earthquake Detection and Hazard Assessment by ElarmS Across California", Geophysical Research Letters, vol. 36, L00B08, pp. 1-6, 2009.

Aprilaire Electronic Thermostats Model 8355 User's Manual, Research Products Corporation, Dec. 2000, 16 pages.

Braeburn 5300 Installer Guide, Braeburn Systems, LLC, 2009, 10 pages.

Braeburn Model 5200 User Manual, Braeburn Systems, LLC, 2011, 11 pages.

SYSTXCCUIZ01-V Infinity Control Installation Instructions, Carrier Corp., 2012, 20 pages.

TB-PAC, TB-PHP, Base Series Programmable Thermostats, Carrier Corp., 2012, 8 pages.

Ecobee Smart Thermostat Installation Manual, 2011, 20 pages.

Ecobee Smart Thermostat User Manual, 2010, 20 pages.

Honeywell Installation Guide FocusPRO TH6000 Series, Honeywell International, Inc., 2012, 24 pages.

Honeywell Operating Manual FocusPRO TH6000 Series, Honeywell International, Inc., 2011, 80 pages.

Honeywell Prestige Product Data, Honeywell International, Inc., 2012, 126 pages.

Honeywell Prestige THX9321-9421 Operating Manual, Honeywell International, Inc., 2011, 120 pages.

VisionPRO TH8000 Series Installation Guide, Honeywell International Inc., 2012, 12 pages.

VisionPRO TH8000 Series Operating Manual, Honeywell International Inc., 2011, 96 pages.

VisionPRO Wi-Fi Programmable Thermostat Model TH8320WF, Honeywell International Inc., 2012, 48 pages.

Hunter Internet Thermostat Installation Guide, Hunter Fan Co., 2012, 8 pages.

Lennox ComfortSense 5000 Series Owner's Guide, Lennox Industries Inc., 2007, 32 pages.

Lennox ComfortSense 7000 Series Homeowner's Guide, Lennox Industries Inc., 2009, 15 pages.

Lennox iComfort Touch Thermostat Homeowner's Manual, Lennox Industries Inc., 2010, 20 pages.

LUXPRO PSPU732T Instruction Manual, LUX Products Corporation, 2009, 48 pages.

RobertShaw 9620 Digital Programmable Thermostat Product Manual, Maple Chase Company, 2001, 14 pages.

RobertShaw Deluxe Programmable Thermostats Product Manual, Maple Chase Company, 2006, 36 pages.

Trane Communicating Thermostats for Fan Coil Control, Trane, 2011, 32 pages.

Trane Communicating Thermostats for Heat Pump Control, Trane, 2011, 32 pages.

Trane TCONT600AF11MA Programmable Comfort Control Installation Instructions, Trane, 2006, 16 pages.

Trane ComfortLink II Installation Guide, Trane, 2011, 20 pages.

Venstar Commercial Thermostat T2900 Owner's Manual, Venstar Inc., 2008, 113 pages.

Venstar Residential Thermostat T5800 Owner's Manual, Venstar Inc., 2011, 63 pages.

White-Rodgers Model 1F81-261 Installation and Operating Instructions, White-Rodgers, Emerson Electric Co., 2010, 8 pages.

White-Rodgers Emerson Blue Wireless Comfort Interface 1F98EZ-1621 Homeowner User Guide, White-Rodgers, Emerson Electric Co., 2012, 28 pages.

Electric Heat Lock Out on Heat Pumps, Washington State University Extension Energy Program, Apr. 2010, 3 pages.

Ecobee Smart Si Thermostat Installation Manual, Ecobee, 2012, 40 pages.

Ecobee Smart Si Thermostat User Manual, Ecobee, 2012, 44 pages.

Mozer, M., "The Neural Network House: An Environment that Adapts to its Inhabitants", AAAI Technical Report SS-98-02, pp. 110-114, 1998.

Mozer, M., et al., "The Neurothermostat: Predictive Optimal Control of Residential Heating Systems", Adv. in Neural Info. Proc. Systems 9, pp. 953-959, Cambridge, MA, MIT Press, 1997.

Net/X WiFi Thermostat Consumer Brochure, NetworkThermostat, 2012, 2 pages.

NetworkThermostat RP32-WIFI Thermostat Specification Sheet, NetworkThermostat, 2012, 2 pages.

Lu et al., "The Smart Thermostat: Using Occupancy Sensors to Save Energy in Homes", In Proceedings of the 8th ACM Conference on Embedded Networked Sensor Systems, Nov. 2010, pp. 211-224.

Gao et al., "The Self-Programming Thermostat: Optimizing Setback Schedules based on Home Occupancy Patterns", In Proceedings of the First ACM Workshop on Embedded Sensing Systems for Energy-Efficiency in Buildings, ACM, 2009; 6 pages.

Perfect Climate Comfort Center Control System Product Data Sheet, Honeywell, 2001, 44 pages.

T8611G Chronotherm IV Deluxe Programmable Heat Pump Thermostat Product Data, Honeywell Inc., 1997, 24 pages.

Introducing the new Smart Si thermostat, Ecobee.com, retrieved from the Internet at http://www.ecobee.com/solutions/home/smart-si/ on Mar. 11, 2013, 5 pages.

Deleeuw, Ecobee WiFi Enabled Smart Thermostat Part 2: The Features Review, Retrieved from <URL: http://www.homenetworkenabled.com/content.php?136-ecobee-WiFi-enabled-Smart-Thermostat-Part-2-The-Features-review>, Dec. 2, 2011; 5 pages.

Loisos et al., "Buildings End-Use Energy Efficiency: Alternatives to Compressor Cooling", California Energy Commission, Public Interest Energy Research, Jan. 2000, 80 pages.

Scott, J., et al., "PreHeat: Controlling Home Heating Using Occupancy Prediction", In Proceedings of the 13th International Conference on Ubiquitous Computing, pp. 281-290, ACM, 2011.

Erickson, V., et al., "Energy Efficient Building Environment Control Strategies Using Real-Time Occupancy Measurements", In Proceedings of the First ACM Workshop on Embedded Sensing Systems for Energy-Efficiency in Buildings, pp. 19-24, ACM, 2009.

Melfi, R., et al., "Measuring Building Occupancy Using Existing Network Infrastructure", In Green Computing Conference and Workshops (IGCC), 2011 International, pp. 1-8, IEEE, 2011.

Akhlaghinia, M., et al., "Occupancy Monitoring in Intelligent Environment Through Integrated Wireless Localizing Agents" In 2009 IEEE Symposium on Intelligent Agents, Piscataway, NJ, USA, vol. 30, 2009, 7 pages.

Cisco Systems, White Paper, "Wi-Fi Based Real-Time Location Tracking: Solutions and Technology", Cisco Systems, Inc., 2006, 6 pages.

Nordman, B., et al., "Using Existing Networks for Energy Purposes", In Proceedings of the First ACM Workshop on Embedded Sensing Systems for Energy-Efficiency in Buildings, ACM, 2009, 2 pages.

* cited by examiner

OCCUPANCY PATTERN DETECTION, ESTIMATION AND PREDICTION

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

This invention generally relates to occupancy detection, estimation and prediction. More particularly, embodiments of this invention relate to predicting occupancy of an enclosure and to systems and methods for detecting occupancy of an enclosure.

Techniques for detecting or sensing occupancy in a structure such as a building is known for a number of applications. For example, an occupancy sensor device attempts to determine if someone is in a room, and is often used in home automation and security systems. Many occupancy sensors that are used for home automation or security systems are based on motion sensors. Motion sensors can be mechanical, for example a simple tripwire, or electronic. Known methods for electronic occupancy detection include acoustical detection and optical detection (including infrared light, visible, laser and radar technology). Motion detectors can process motion-sensor data, or employ cameras connected to a computer which stores and manages captured images to be viewed and analyzed later or viewed over a computer network. Examples of motion detection and sensing applications are (a) detection of unauthorized entry, (b) detection of cessation of occupancy of an area to extinguish lighting and (c) detection of a moving object which triggers a camera to record subsequent events. A motion sensor/detector is thus important for electronic security systems, as well as preventing the wasteful illumination of unoccupied spaces.

Furthermore, some applications can greatly benefit from (even modestly accurate) predictions of future occupancy. For example, heating or cooling of a structure to an acceptable temperature range has an associated lag time of several minutes to more than one hour between actuation and achieving the desired thermal conditions. Therefore it is beneficial to predict with some statistical accuracy, ahead of time, when an occupant or occupants will be entering and/or leaving structure, or moving between different regions or rooms within the structure.

Attempts have been made at predicting occupancy. For example, M. Mozer, L. Vidmar, and R. Dodier, "The Neurothermostat: Predictive Optimal Control of Residential Heating Systems" appearing in M. Mozer et al. *Adv. in Neural Info. Proc. Systems* 9, (pp. 953-959). Cambridge, Mass.: MIT Press. 1997, discusses a research project in which an occupancy predictor uses a hybrid neural net/look-up table to estimate the probability that an occupant will be home.

According to some embodiments, systems and methods for predicting occupancy of an enclosure are provided. The systems can include a model of occupancy patterns based in part on information of the enclosure and/or the expected occupants of the enclosure, and a sensor adapted to detect occupancy within the enclosure. An occupancy predictor is adapted and programmed to predict future occupancy of the enclosure based at least in part on the model and the occupancy sensor. The model is preferably an a priori stochastic model of human occupancy created prior to installation of the system into the enclosure, and the model preferably includes behavior modeling of activity, itinerary, and/or thermal behavior.

According to some embodiments, the model is based at least in part on the type of the enclosure, with exemplary types including: workplace, single-family home, apartment, and condominium. According to some embodiments, the model is based at least in part on geometrical and structural data about the enclosure.

According to some embodiments, the model is based at least in part on an expected type of occupant of the enclosure. Examples of types of occupant attributes include: age, school enrollment status, marital status, relationships status with other occupants, and retirement status. Examples of expected occupant types include: preschool children, school-age children, seniors, retirees, working-age adults, non-coupled adults, vacationers, office workers, retail store occupants.

According to some embodiments, the model is based in part on seasons of the year and/or the geographic location of the enclosure. The enclosure can be various types of dwellings and/or workplaces.

According to some embodiments, the occupancy prediction of the enclosure is also based in part on user-inputted data, such as occupancy information directly inputted by an occupant of the enclosure, and/or calendar information such as holidays, seasons, weekdays, and weekends.

The occupancy prediction can be used in the actuation and/or control of an HVAC system for the enclosure or various other applications such as: home automation, home security, lighting control, and/or the charging of rechargeable batteries.

According to some embodiments, various systems and methods for detecting occupancy of an enclosure, such as a dwelling, are provided. Examples include: detecting motion, monitoring communication signals such as network traffic and/or mobile phone traffic, monitoring sound pressure information such as in the audible and/or ultrasonic ranges, monitoring utility information such powerline information or information from Smart Meters, monitoring motion in close proximity to the sensor, monitoring infrared signals that tend to indicate operation of infrared controllable devices, sudden changes in ambient light, and monitoring indoor air pressure (to distinguish from pressure mats used in security applications) information which tends to indicate occupancy.

According to some embodiments, the occupancy predictor includes one or more algorithms for predicting occupancy based on one or more occupancy patterns, and the occupancy predictions are based in part on a maximum-likelihood approach.

As used herein the term "model" refers generally to a description or representation of a system. The description or representation can use mathematical language, such as in the case of mathematical models. Examples of types of models and/or characteristics of models, without limitation, include: lookup tables, linear, non-linear, deterministic, probabilistic, static, dynamic, and models having lumped parameters and/or distributed parameters.

As used herein the term "sensor" refers generally to a device or system that measures and/or registers a substance, physical phenomenon and/or physical quantity. The sensor may convert a measurement into a signal, which can be interpreted by an observer, instrument and/or system. A sensor can be implemented as a special purpose device and/or can be implemented as software running on a general-purpose computer system.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
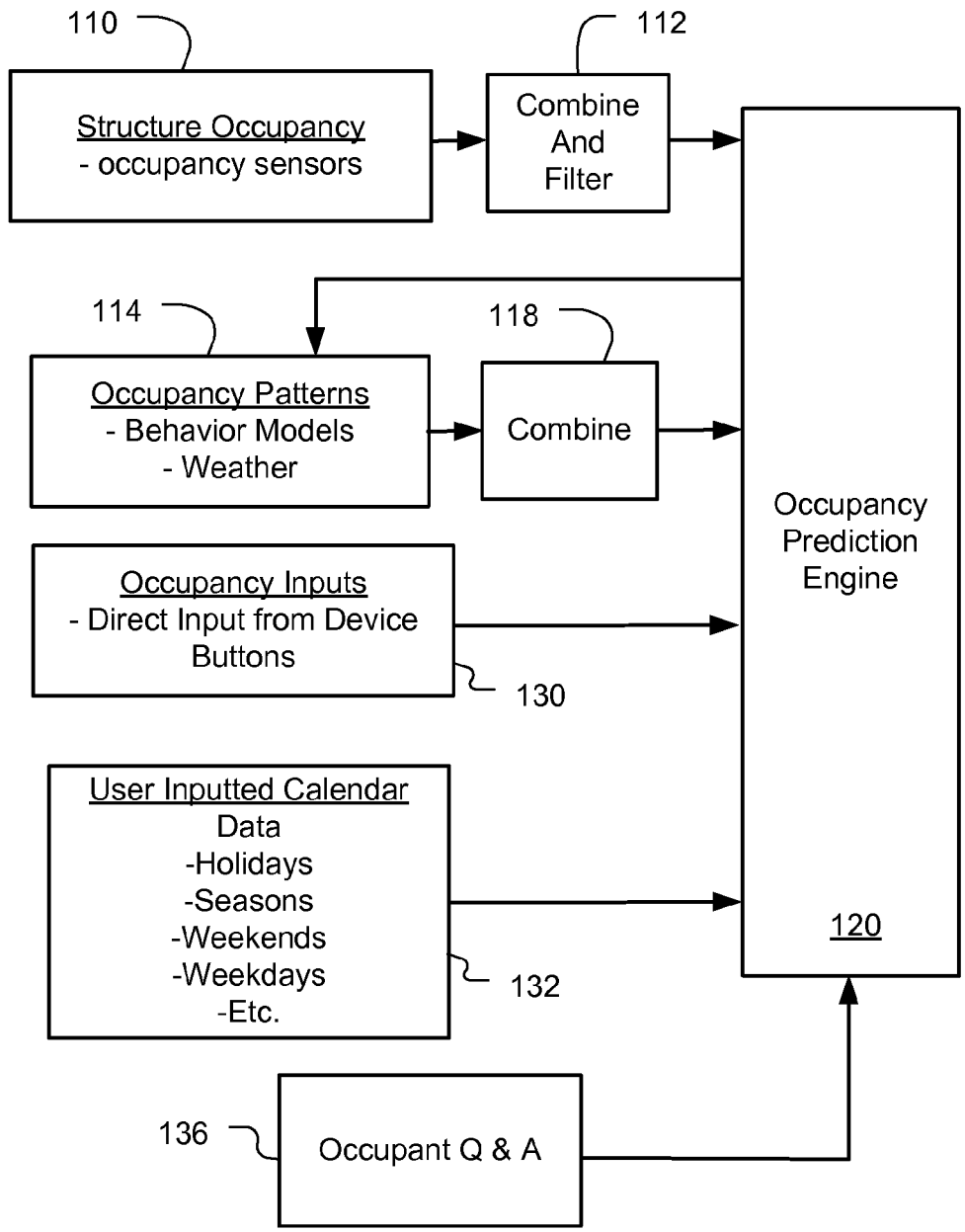
FIG. 1 is a block diagram illustrating a system for occupancy prediction, according to some embodiments.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

According to some embodiments, methods and systems for estimating, predicting into the future and transmitting specific data or statistics of occupancy or occupancy patterns in a structure such as a home, apartment, other dwelling or building are described. Predicting and/or detecting occupancy of an enclosure, such as a building, can be used for a number of applications. For example, applications that can benefit from accurate occupancy prediction include heating, ventilating and air conditioning (HVAC), lighting management, hot water heating and management, security, emergency response, and the management and charging of rechargeable batteries (e.g. for electric vehicles). In general, applications that greatly benefit from occupancy prediction are those that particularly benefit from knowing or accurately estimating, in advance, when the structure will be occupied. The lead-time of the prediction will especially aid applications that have an inherent lag-time to reach a certain state. For example, heating and cooling a structure to an acceptable level has an associated lag time of several minutes to more than one hour. Therefore it is beneficial to accurately predict ahead of time, when an occupant or occupants will be entering and/or leaving structure. Additionally, energy savings can be obtained due to predicting and/or detecting occupancy for both short term, such as intraday periods and long term, such as multi-day vacation periods, when the structure can remain unconditioned or more economically conditioned.

According to some embodiments, systems and methods for detecting, estimating and predicting into the future occupancy patterns within a structure are described. The systems can include a prior (a priori) stochastic model of human occupancy, thermal comfort and activity patterns, based in part on information pertaining to the type, dimensions, layout and/or the expected average number of occupants of the structure (whether a home or other type of structure) and on the calendar (time of year, day of week, time of day), and also based on prevailing and forecast local weather conditions. Such a stochastic model can have multiple parameters, which can be initially estimated from a questionnaire filled by residents and/or from accumulated statistical data for structures of type and usage, and occupant characteristics (i.e. according to household type) similar to the structure in question. Over time, the parameters of the a priori stochastic occupancy/comfort/activity model, can be further trained using cumulative logs of sensor data acquired within the actual structure in question. This can be carried out by comparing the a priori model to the actual output of the occupancy prediction engine 120. For example, if the a priori model predicts the absence of occupants on Wednesdays during daytime, but occupancy sensors sense human presence on Wednesdays consistently for several weeks, the a priori behavior model can be corrected for this information. Similarly, aggregates of output from the prediction engine 120 can be used to refine other parameters of the a priori behavior model. The method for carrying out such updates can use the some or a combination of the algorithms mentioned herein for the prediction engine itself. These corrected a priori models if stored in a database can inform future a priori models to pre-seed other homes with similar structures or households.

According to some embodiments, the system can also include one or several occupancy sensor(s) and associated software, adapted to detect occupancy within the structure or within particular regions of the structure. The system and methods can include occupancy-pattern estimation and prediction algorithms, the computations of which may be run locally and/or remotely on an internet server. The estimation and prediction algorithms can utilize the a priori stochastic model, together with local motion and occupancy sensor/detector data and weather reports/forecasts, to compute maximal-likelihood estimators for the current, past and near-term future human occupancy patterns within the structure, even in regions or rooms within the structure which are outside the range of the motion sensor devices installed in the structure.

According to some embodiments, systems and methods for detecting, estimating and predicting into the future occupancy patterns within a structure are described, in which the occupancy-pattern predictor is adapted and programmed to predict statistically likely patterns of future occupancy in the structure based at least in part on the prior (a priori) stochastic occupancy/comfort/activity model, and also on the occupancy and motion sensors and detectors. The a priori model is preferably created prior to installation of the system into the structure, and it preferably stochastically models human motions within the structure; exits and entrances from and into the structure; itineraries of activity types; and human thermodynamic comfort in terms of ambient conditions such as temperature, humidity, airflow, motion, clothing and interaction with furniture. The a priori stochastic model can include one or more statistical profiles.

According to some embodiments, systems and methods for detecting, estimating and predicting into the future occupancy patterns within a structure are provided, in which a subset of the occupancy-pattern estimator and predictor algorithms embody analytical and numerical methods to approximate, and rapidly compute, the past and future time evolution of the spatial distribution of thermodynamic environmental state variables within the structure. The list of thermodynamic state variables can include ambient temperature and humidity. In some embodiments, it may also include particulate-matter densities.

According to some embodiments, the a priori stochastic model is based at least in part on the type of structure in question, with exemplary types including but not limited to: workplace, single-family home, apartment, and condominium.

According to some embodiments, the a priori stochastic model is based at least in part on an expected distribution of types of occupants residing, or frequenting, the structure, and of their attributes. Examples of occupant attributes include: age, school enrollment status, marital status, relationships status with other occupants, and retirement status. Examples of expected occupant types include: preschool children, school-age children, seniors, retirees, working-age adults, non-coupled adults, adults comprising a family, vacationers, office workers, retail store occupants.

According to some embodiments, the a priori stochastic model is based in part on seasons of the year and/or the geographic location of the structure. The structure can be one of various types of dwellings and/or workplaces.

According to some embodiments, the occupancy-pattern estimations and predictions for the structure can be based in part on user-inputted data, such as occupancy-questionnaire and temperature/humidity/fan-speed set point preferences, which are from time to time directly inputted by occupants of the structure. The estimation and prediction computations can also be based in part on calendar information such as holidays, seasons, weekdays, and weekends. Estimation and prediction computations can be performed on various timescales. Estimations and predictions of occupancy patterns within a given time window on a given day (whether past, present or future) can give special weight to past occupancy and/or occupant-supplied data logged during the same time of day and/or the same day of the week.

FIG. 1 is a block diagram illustrating a system for occupancy prediction, according to some embodiments. In FIG. 1, the occupancy prediction engine 120 can be pre-seeded or pre-loaded with occupancy patterns 114 such as behavior models. Based on the pre-loaded behavior models 114, which can be combined 118 and inputted, the prediction engine 120 makes predictions of occupancy. The prediction engine compares its predictions with actual occupancy sensor data, for example, from occupancy sensors 110, and/or from direct input from a user via input 130. If the prediction is incorrect, according to some embodiments, the occupancy prediction engine 120 learns so as to avoid making incorrect predictions in future situations having similar circumstances.

According to some embodiments, occupancy prediction engine 120 provides a probability distribution on when the inhabitants are expected to depart and arrive. According to some embodiments a method found to be useful when data quality is not always of high quality, is to make a "seasonal model." According to the seasonal model, it is known that a day is 24 hours long, and there are separate cases for workdays and non-workdays. According to some embodiments, there can be separate cases for all days of the week, additionally, for certain seasonal periods such as summer and winter.

According to some embodiments a probability distribution (for example, the normal distribution, or some other distribution) is fitted to the detected or directly sensed departure and arrival times of the inhabitants'. Such a process may be applicable in cases of relatively poor occupancy data quality, for example, where assumptions have to be made about the inhabitants' habits such as that they're only out of the house one time per day.

Slightly more complex techniques may be suitable when improved data quality is available. According to some embodiments, a seasonal ARMA (autoregressive moving average) model is fitted to the occupancy data. According to such embodiments, it is assumed that the occupancy data has a certain periodic component (for example, the "season") but also depends on the previous observations in a certain way. This would allow a prediction of multiple leave/arrive events in a single day—provided that the available data is good enough to support it.

According to some embodiments, occupancy predictions are obtained directly from the data stream of the sensors. For example, the detectors such as occupancy sensors 110 have some level coming out of it, that is normally rounded to '1' for 'occupied' or '0' for 'unoccupied' in the combine and filters system 112. However, in these direct embodiments, the output from occupancy sensors 110 are kept between 0 and 1 for use in a more complex model. There are many types of models that could be used. For example, a graphical model, which is somewhat akin to a neural net, could be used.

According to some embodiments, AR (auto regressive), MA (moving average), or ARMA (autoregressive moving average) time series methods are used. According to some embodiments an automated regression with exogenous terms (ARX) is used.

According to some other embodiments, the parameters of arrival/departure time parametric distribution, such as normal, gamma, beta, poisson, or any other distribution, are estimated from the occupancy data.

According to some other embodiments, a Graphical Model including Bayesian Network, Hidden Markov Model, Hidden Semi-Markov Model, other variant of Markov model, Partially Observable Markov Decision Process models can be used for occupancy prediction.

According to other embodiments, one or more of the following could be used in prediction engine 120 alone or in combination: Neural Network, Latent Variable Model, Bayesian Network, Graphical Model, Regression Tree. other tree-based model, Additive Models, (Linear, Quadratic, Fisher, or another) Discriminant Analysis, Support Vector Machines, another classification technique, Principle Component Analysis, Factor Analysis, Kernel Methods, Ordinary Regression, Logistic Regression, Penalized (or Regularized) Regression, another type of regression, boosting methods, Splines, Wavelets, Least-squares function fitting, another type of function estimation, Expectation-Maximization Algorithm, Belief Propagation Algorithm, Nearest Neighbor Algorithms, Clustering Algorithms, another learning technique, another time series forecasting technique.

According to some embodiments, the modeling technique used for occupancy prediction engine 120 is to gather inputs, e.g. combined and filtered occupancy sensor data 110, combined occupancy patterns 114, direct occupancy inputs 130, inputted user data 132, and occupant Q & A 136. Weights or other statistical methods are then assigned or attributed to each input. The weighted inputs are then totaled in real time to get the occupancy prediction. When designing the weight for each input, an analysis of each data type should be undertaken. For example, when incorporating data from occupancy sensors 110 and/or from a user via input 130, the direct user input 130 may be assumed to have no error, while the sensors 110, may be assumed to have some error depending on the type of sensor.

According to some embodiments, the prediction engine 120 looks for different periodicities such as daily, weekly, monthly, seasonally, and yearly, in the inputs from some or all of patterns 114, occupancy inputs 130, calendar data 132 and sensor data 110. According to some embodiments, the events and/or patterns from the near past can be more heavily weighted than events and/or patterns from the more distant past.

According to some embodiments, systems and methods for occupancy prediction with increased accuracy are provided that include seeding an occupancy prediction model in advance. Such pre-seeding can be done using one or more types of information. For example, pre-seeding of an occupancy prediction model can be performed depending on a group type, where the group can be demographic, location, geographic area. Increased accuracy of occupancy prediction can be obtained by pre-seeding the occupancy prediction models with data based on prior information, followed by using occupancy sensing data to modify the model according to the sensor data.

According to some embodiments, prediction engine 120 is pre-seeded by using appropriate values for various coefficients in mathematical models prior to the models entering the learning phase via sensor data input. By pre-seeding, the prediction engine 120 can already have a good starting point prior to any sensing input. The learning time when placed into a new environment also can be reduced.

According to some other embodiments a neural net or look up table can be used as part of the prediction engine 120. For further detail, see: M. Mozer, L. Vidmar, and R. Dodier, "The Neurothermostat: Predictive Optimal Control of Residential Heating Systems" appearing in M. Mozer et al. *Adv. in Neural Info. Proc. Systems* 9, (pp. 953-959). Cambridge, Mass.: MIT Press. 1997, which is incorporated by reference herein.

Figure 2:
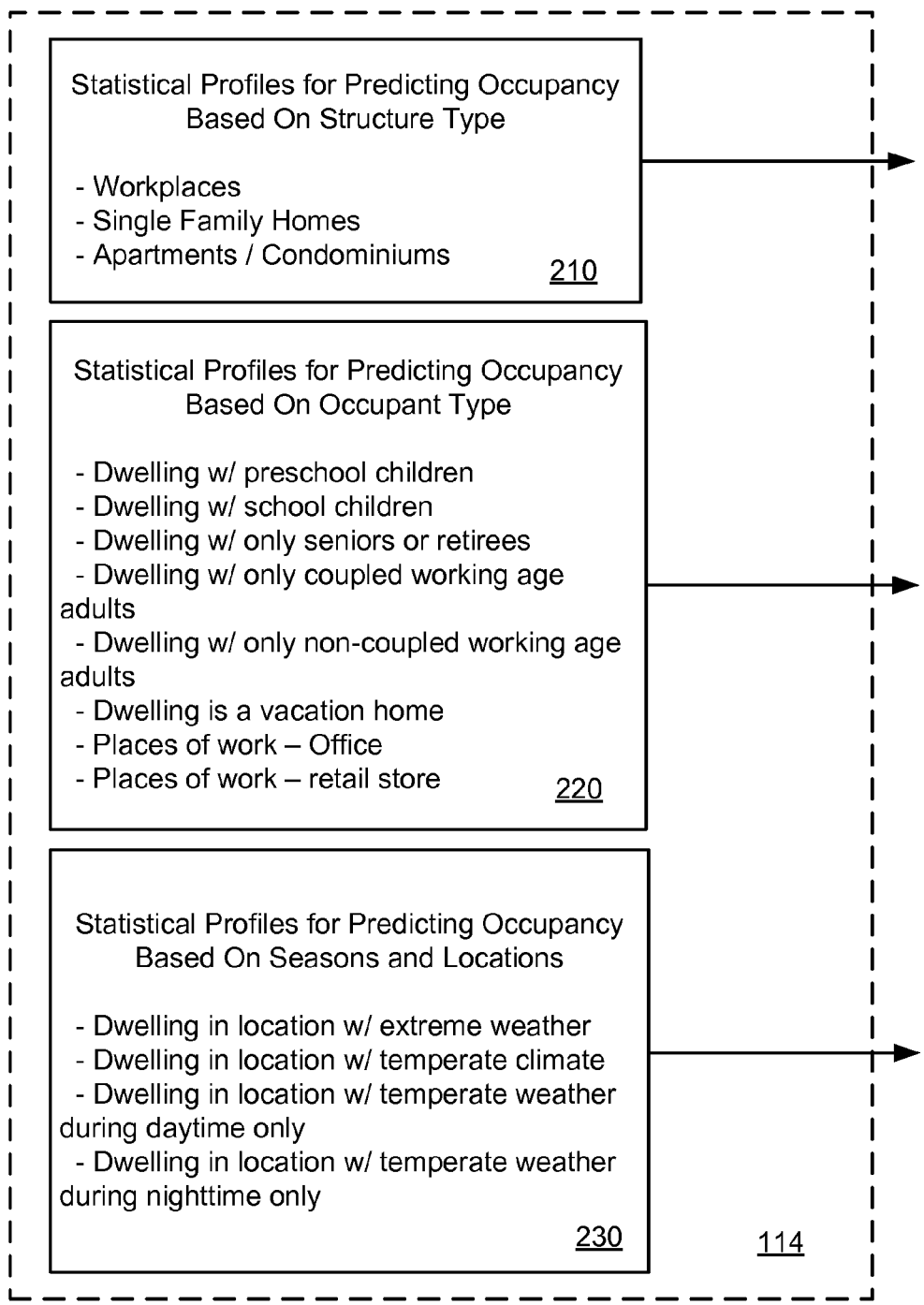
FIG. 2 is a block diagram illustrating examples of statistical profiles for predicting occupancy, according to some embodiments.

According to some embodiments, examples of statistical profiles used for occupancy prediction will be provided. FIG. 2 is a block diagram illustrating examples of statistical profiles for predicting occupancy, according to some embodiments. Occupancy patterns 114 in the form of statistical profiles can be based on several types of information, for example, based on structure types, for occupant type data, and for seasons and locations and can be informed at least in part by actual survey data.

Profiles 210 are examples of statistical profiles for predicting occupancy based on structure type data. For example, statistical profiles can be used for structure types such as single-family homes, apartments, condominiums, offices, etc. For workplaces, for example, likelihoods of scheduled periods of occupancy and non-occupancy can be used to predict occupancy. Company and individual worker schedule inputs, if available, can also be used. Holiday schedule inputs, if available, can also be used.

If the structure type is a single-family home, for example, then likelihoods of varied awake hour occupancy patterns throughout the dwelling can be used to predict occupancy. Likelihoods of sleep hour occupancy patterns confined regularly to certain rooms and zones can also be used.

If the structure type is an apartments or condominiums, then likelihoods of living areas close together can be used to predict occupancy. An increased likelihood of regular local patterns of occupancy be used; as can an increased likelihood of full use of the space during occupied waking hours.

Profiles 220 are examples of statistical profiles for prediction occupancy based on occupant type. Such occupant types include: roommates, families, seniors, and type of company or business. For example, dwellings with one or more preschool age children can reflect the following likelihoods: (1) few regularly scheduled 4+ hour periods when the home isn't occupied; (2) few regular 4+ hour night periods when every occupant is asleep; and (3) that one or more occupants will both retire and rise relatively early each day.

In another example, dwellings with one or more school age children can reflect the following likelihoods: (1) the home being regularly unoccupied for 4+ hours; (2) occupants having varied occupancy schedules; (3) the need for school calendar and vacation data inputs; (4) the need for work calendar and vacation data inputs; and (5) if teenagers, that one or more occupant will retire relatively late each day.

In another example, dwellings exclusively of seniors or retirees can reflect the following likelihoods: (1) few regularly scheduled 4+ hour periods when the home isn't occupied; (2) the need for activity schedule inputs; and (3) that occupants will retire early and rise late, and may sleep during the day.

In another example, dwellings exclusively of coupled working age adults can reflect the following likelihoods: (1) occupants having similar away schedules and sleep schedules; (2) occupants gathering regularly in the dwelling; and (3) the need for work and/or school calendar and vacation data inputs In another example, dwellings exclusively of non-coupled working age adults can reflect the following likelihoods: (1) occupants having varied away schedules and sleep schedules; (2) occupants separating regularly in the dwelling; and (3) the need for work and/or school calendar and vacation data inputs.

In another example, dwellings that are vacation homes can reflect a likelihood of long periods of non-occupancy.

In another example, places of work, including offices and retail stores can reflect the following likelihoods: (1) scheduled periods of occupancy and non-occupancy; (2) the need for company and individual work schedule inputs; (3) the need for work holiday schedule inputs; and (4) store opening hours.

Profiles 230 are examples of statistical profiles for prediction occupancy based on seasons and locations. In particular, according to some embodiments, information about weather and climate based on location information is combined with the behavior model information described above.

For example, dwellings in locations experiencing very cold or very hot seasonal weather or seasonal precipitation can reflect likelihoods of increased occupancy. In another example, dwellings in locations experiencing temperate seasonal weather can reflect likelihoods of decreased occupancy. In another example, dwellings in locations which seasonally experience temperate weather during the day but very cold weather at night can reflect likelihoods of decreased daily but increased evening occupancy. An in another example, dwellings in locations which seasonally experience very hot weather during the day but temperate weather at night can reflect likelihoods of increased daily but decreased evening occupancy.

According to some embodiments behavior models are predetermined schedules that are used to give initial conditions to the prediction engine 120. It can be thought of as additional statistical data this is input to engine 120 in a similar fashion as is data that is collected from other inputs such as from sensors 110.

Figure 3:
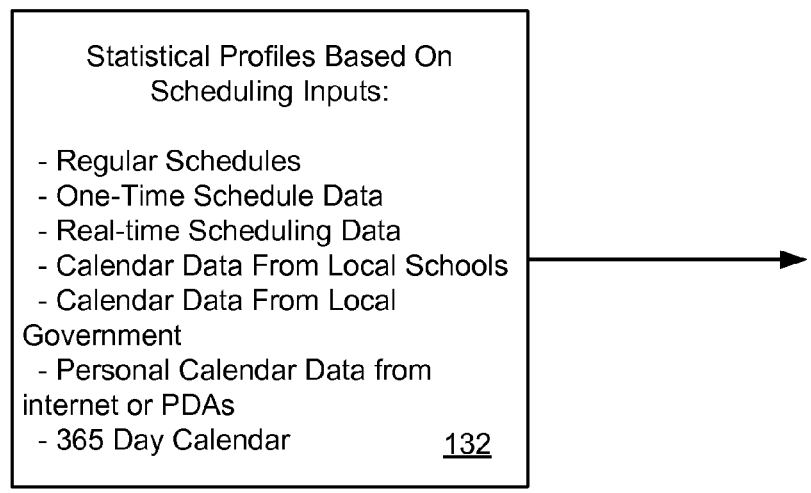
FIG. 3 is a block diagram illustrating occupancy prediction based in part on scheduling inputs, according to some embodiments.

FIG. 3 is a block diagram illustrating occupancy prediction based in part on scheduling inputs, according to some embodiments. Profiles 132 are examples of statistical profiles for prediction occupancy based on scheduling inputs. According to some embodiments, regular scheduling data is input (at the thermostat and/or remotely) that defines, for example: regular periods daily, weekly, monthly or yearly when the dwelling will be vacant; regular periods daily, weekly, monthly or yearly when the dwelling will be occupied; and regular periods daily when the occupants will be asleep.

According to some embodiments, one-time scheduling data is input (at the thermostat and/or remotely) that deviates from regular occupancy patterns, that defines, for example: sustained periods of vacancy (such as a vacation or day away); and sustained periods of occupancy (such as being home recovering from illness or taking a day off from work).

According to some embodiments, real-time scheduling data is input (at the thermostat and/or remotely) that defines, for example: occupants returning early from scheduled activities; occupants leaving unexpectedly; and or other changes in the usual schedule.

According to some embodiments, calendar data from local school schedules are input that reflect a likelihood of increased occupancy for families for days when school is not in session (such as snow days, half-days, or government days).

According to some embodiments, calendar data from local government schedules are input, that reflect a likelihood of increased occupancy for holidays and national or local days off.

According to some embodiments, personal calendar data gathered from the internet, smart phones, or PDAs are input that reflect likelihoods: of decreased occupancy during travel, events, appointments, and meetings; of increased occupancy during events hosted in the dwelling; of increased occupancy in the absence of scheduled events elsewhere.

According to some embodiments, a 365 day calendar for occupancy scheduling and prediction is input that reflects the likelihood of yearly and seasonal events leading to periods of increase or decrease in occupancy; for example around December 25, many families experience increased occupancy at home and many places of work, decreased occupancy.

Figure 4:
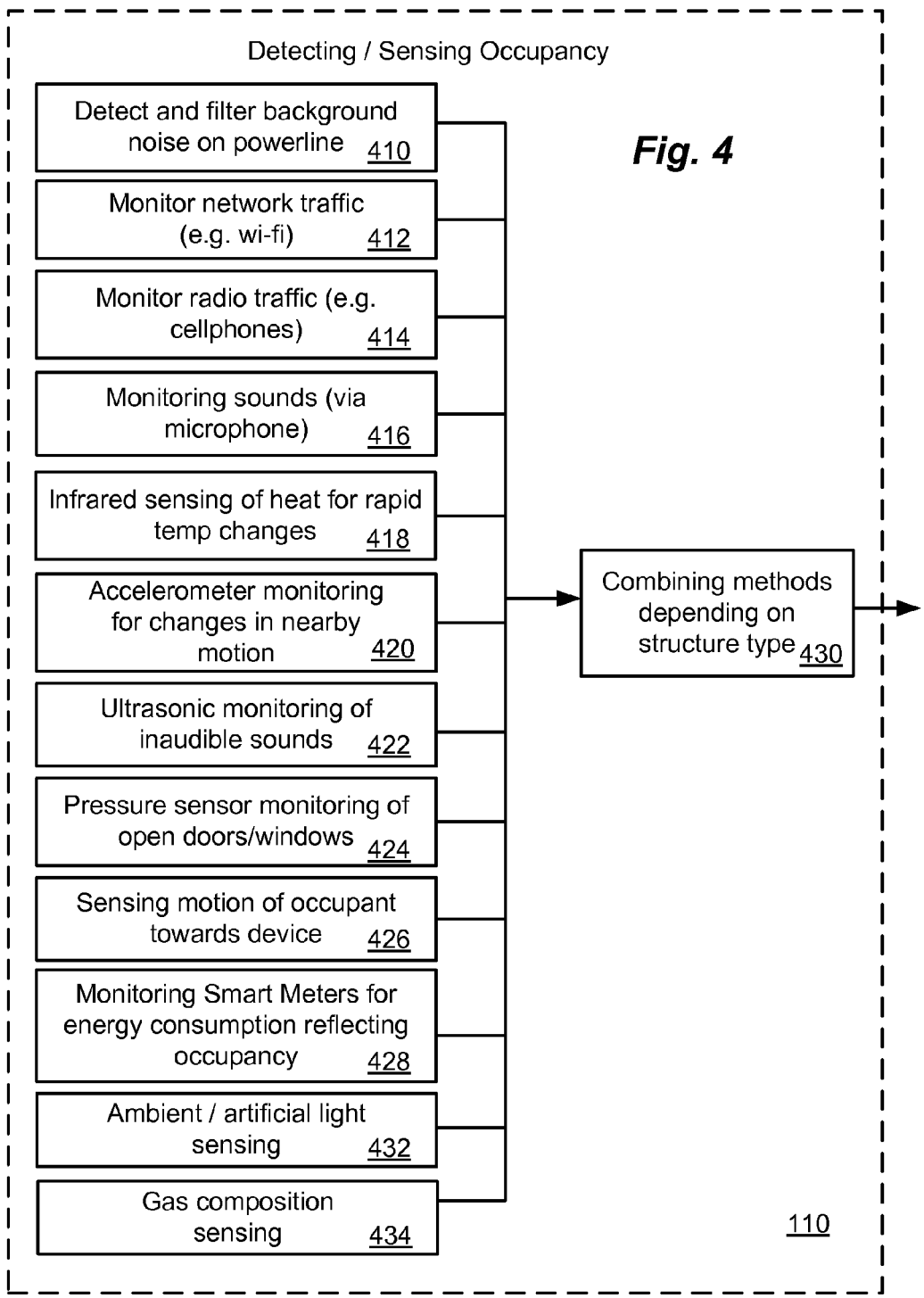
FIG. 4 is a block diagram illustrating occupancy detection based on sensing, according to some embodiments.

According to some embodiments, further detail on systems and methods for detecting occupancy will not be provided. FIG. 4 is a block diagram illustrating occupancy detection based on sensing, according to some embodiments. One or more of the shown sensing techniques can be used to detect occupancy.

According to technique 410, background noise on the main powerline is monitored and filtered to detect the use of electronic devices, which indicates a likelihood of occupancy in the dwelling.

According to technique 412, network connections (wifi, email or specific ports) are monitored for changes in traffic, which indicates a likelihood of internet usage and therefore occupancy. According to some embodiments physical layer traffic can be monitored for patterns indicating occupancy. For example, radio signals can be detected using an antenna. According to some other embodiments, packets or traffic in any of the software layers (such as monitoring ports, or just looking for more traffic in general) can be sniffed.

According to technique 414, a radio sensor is used monitor changes in low emission radio waves reflecting the likely presence of occupants. This technique is similar to the network traffic monitoring technique described above, but applied to monitoring of mobile phone traffic or other radio signals. According to some embodiments, the two techniques 412 and 414 are used in combination.

According to technique 416, a microphone is used to monitor sounds (within the audible range) that reflect likelihoods of occupancy, such as footsteps, voices, doors closing.

According to technique 414, an infrared sensor is used to monitor the heat of the dwelling so that rapid changes in temperature within a close proximity, e.g. ten feet, of the sensor (such as people moving), which reflects a likelihood of occupancy.

According to technique 418, an infrared sensor is used to detect the use of infrared devices such as a television remote, which reflects a likelihood of occupancy. A majority of remotes use infrared technology to send commands to the television, stereo, etc. This communication is not direct in space but is spread around the room. The occupancy sensing device, such as a thermostat, can pick up these commands and infer that people are home if they are using their remotes.

According to technique 420, an accelerometer is used to monitor changes in motion that reflect likelihoods of occupancy within 1 meter of the sensor. Accelerometers measure acceleration and therefore implied force. Using one of these sensors, vibrations due to footsteps or other human motion can be detected when occupants are nearby.

According to technique 422, an ultrasonic (sonar) microphone is used to monitor sounds out of audible range that reflect likelihoods of occupancy. Activity such as footsteps and air moving due to human movement create noise in the ultrasonic range. The ultrasonic microphone is used to pick such noise and infer based on pattern recognition and changes from the baseline that humans are present. According to some embodiments, current temperature data is used to correct for changes in the speed of sound due to temperature.

According to technique 426, a sensor is used to detect the motion of an occupant towards the occupancy-sensing device, such as a thermostat, reflecting the likelihood that the occupant intends to interact with it. In anticipation, the interface is automatically prepared for user activity. It has been found that such automatic preparation reduces any lag time perceived by the user as well as significantly enhance the user interface experience. There are multiple sensing techniques that can be used for detecting proximity. According to some embodiments, an IR transmitter and receiver are used to measure the bounce back of the transmission in the receiver. If occupants are nearby, the signal comes back strongly and increasingly strong as they approach.

According to technique 428, smart utility meters, such as Smart Meters, are used to monitor energy consumption reflecting the likely presence of occupants. With real time (or near real time) energy usage information, changes in activity can be measured to imply occupancy, pattern recognition on changes from baseline are used to reflect likelihoods of occupancy. As used herein the term "Smart Meter" refers to any advanced utility meter that identifies consumption in greater detail than a conventional utility meter. Smart Meters generally, but not necessarily have the capability of communicating consumption information via some network back to a local utility supply service for monitoring and/or billing purposes. Smart Meters often refer to electrical meters, but can be used to measure other utilities such as natural gas and water.

According to technique 432, ambient light sensing can indicate presence of artificial light source and distinguish from natural light. Presence of artificial lighting can indicate occupancy. Sudden changes in ambient light can also indicate presence of occupants, such as with switching on and off lights or opening or closing of blinds and/or curtains. According to some embodiments the wavelength composition of incident light can be measured which can help distinguish whether the light source is artificial or natural.

According to technique 434, gas composition can be sensed or monitored for certain components that tend to indicate the presence of occupants. For example, a CO2 sensor can be used to detect levels of CO2 that tend to indicate the presence of occupants. According to some embodiments, sensors for volatile organic compounds can be used to detect pollutants or other gaseous components that tend to indicate the presence of occupants.

According to some embodiments, known GPS and or cell-tower locating technology for locating personal devices such as mobile phones can be used in combination with one or more of the other occupant sensing techniques described herein to aid in occupancy detection.

According to technique 424, a pressure sensor is used to detect open doors/windows. By using a sensitive pressure sensor, you can monitor the change in atmospheric pressure in the home when doors or windows are opened, reflecting a likelihood of occupancy.

According to some embodiments, a combination of techniques 430 are used to determining likelihoods of occupancy, depending on factors, such as the type of structure. For example, a combination of near field detection methods with far detection methods is used for the most effective occupancy detection depending on the type of dwelling Dwellings encompassing large spaces reflecting likelihoods of areas within the dwelling that cannot be reached by line of sight detection methods; so as to benefit from radar or other far field detection methods. Dwellings such as apartments that are limited spaces inside larger buildings benefit from detection methods that are restricted to the limited unit such as infrared or other line of sight methods. In an apartment, there are fewer places to walk by and the detection device, such as a thermostat, will be passed by more frequently (so near field sensing techniques such infrared is preferred). However, apartments often have lots of close neighbors, so far field techniques (such as networked traffic monitoring and radio traffic monitoring) tend not to work as well because those techniques also detect occupancy of the neighbors. On the other hand, in a large single-family home, dwellers may not pass by the thermostat as frequently as the apartment dweller, but because there are no close neighbors, far field techniques tend to work better.

Figure 5:
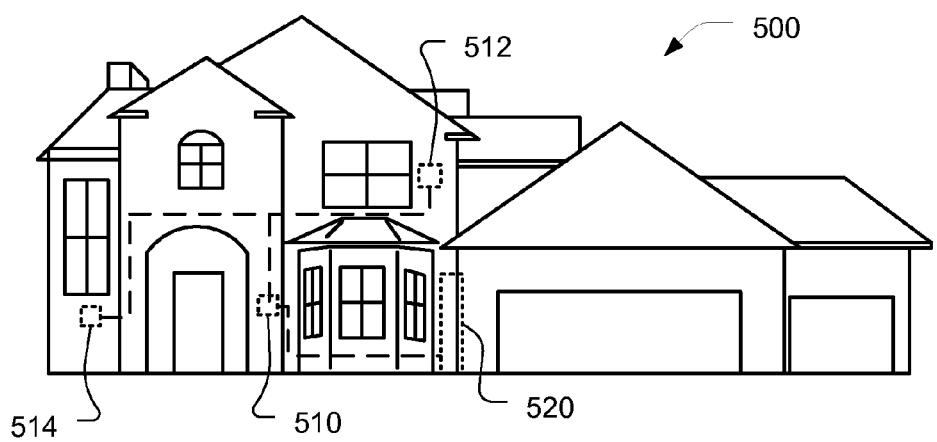
FIG. 5 is a diagram of a structure in which occupancy is predicted and/or detected, according to various embodiments.

FIG. 5 is a diagram of a structure in which occupancy is predicted and/or detected, according to various embodiments. Structure 500, in this example is a single-family dwelling According to other embodiments, the structure can be, for example, a duplex, an apartment within an apartment building, a commercial structure such as an office or retail store, or a structure that is a combination of the above. Occupancy prediction device 510 is shown located within structure 500 and includes all or some of the functionality described with respect to FIG. 1, including the occupancy prediction engine 120 and the occupancy sensors 110. According to some embodiments, one or more separate occupancy sensors, such as sensor 512 and 514 are located within the structure 500. The occupancy sensors such as can be located within device 510 or separately, such as sensors 512 and 514, can be used to carry out the techniques described with respect to FIG. 4. According to some embodiments, output regarding occupancy from device 510 is communicated to a system 520.

Examples of system 520 include an HVAC system for the structure 500, a security system, a lighting control system, and a high capacity battery charging system, such as could be used to power electric vehicles in garage 530.

Figure 6:
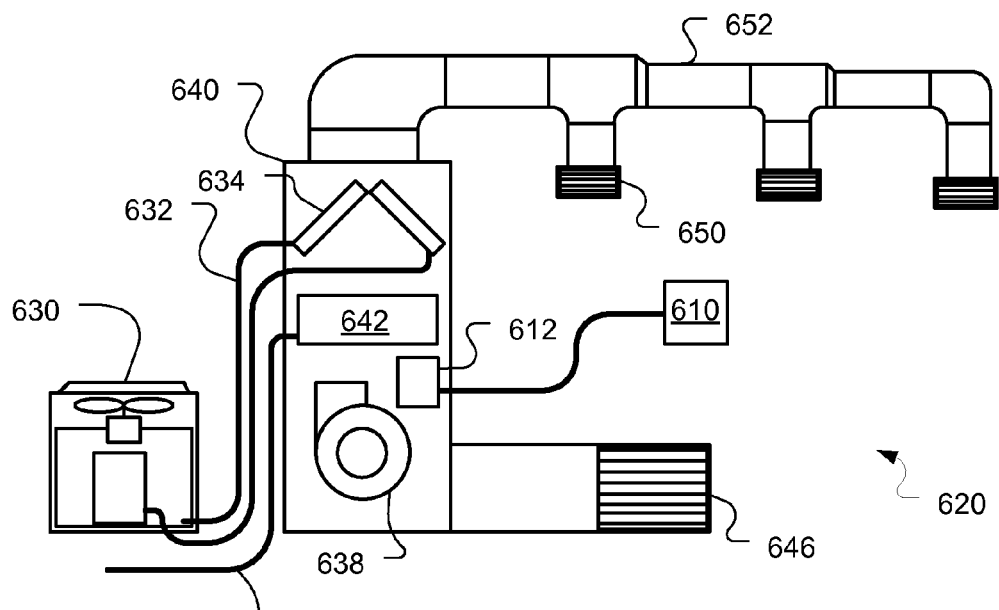
FIG. 6 is a diagram of an HVAC system, according to some embodiments.

FIG. 6 is a diagram of an HVAC system, according to some embodiments. HVAC system 620 provides heating, cooling, ventilation, and/or air handling for the structure, such as a single-family home 500 depicted in FIG. 5. The system 620 depicts a forced air type system, although according to other embodiments, other types of systems could be used such as hydronic and/or in-floor radiant heating. In heating, heating coils or elements 642 within air handler 640 provide a source of heat using electricity or gas via line 636. Cool air is drawn from the structure via return air duct 646 through fan 638 and is heated heating coils or elements 642. The heated air flows back into the structure at one or more locations via supply air duct system 652 and supply air grills such as grill 650. In cooling an outside compressor 630 passes gas such a freon through a set of heat exchanger coils to cool the gas. The gas then goes to the cooling coils 634 in the air handlers 640 where it expands, cools and cools the air being circulated through the structure via fan 638.

The system is controlled by control electronics 612 that communicates with a thermostat 610. According to some embodiments, the thermostat 610 includes some or all of the occupancy prediction and/or detection functionality described with respect to FIG. 1.

According to some embodiments, the occupancy predictions and/or detections made by the techniques described herein maybe used in profiling the behavior of a structure for use by a control system of an HVAC system installed in the structure. For further details, see co-pending U.S. patent application Ser. No. 12/881,463, by Fadell et, al., filed on even date herewith, which is incorporated herein by reference.

According to some embodiments, the device knows where it is, through user or admin setup or by GPS. For example, if an address is known via GPS or by data entry, the device looks up the address and determines, for example, that the structure is a store, office, single-family dwelling, or apartment/condominium.

Figure 7:
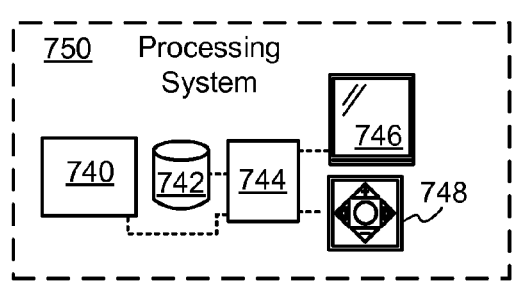
FIG. 7 is a schematic of a processing system used to predict and/or detect occupancy of an enclosure, according to some embodiments.

FIG. 7 is a schematic of a processing system used to predict and/or detect occupancy of an enclosure, according to some embodiments. In particular, processing system 750 is used to perform much of the functionality described with respect to FIG. 1, as well as processing within device 510 described with respect to FIG. 5. Processing system 750 includes one or more central processing units 744, storage system 742, communications and input/output modules 740, a user display 746 and a user input system 748.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method for detecting occupancy of an enclosure comprising:
   determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, communication signals which indicate a likelihood of occupancy of the enclosure ranging from not occupied to occupied;

revising the model of occupancy patterns based at least in part on the monitored communication signals; and determining a probability that occupants of the enclosure will depart from or arrive at the enclosure at a certain time of the day based on the revised model of occupancy patterns, wherein the pre-existing model is generated based on a type of information other than the monitored communication signals.

2. A method according to claim 1 wherein in the communication signals is one or more network connections and the monitoring includes monitoring for changes in network communications which indicate a likelihood of occupancy.

3. A method according to claim 2 wherein the one or more network connections include a network connection of a type selected from a group consisting of: wi-fi and email.

4. A method according to claim 2 wherein the changes in network communication includes monitoring changes in network traffic which indicate a likelihood of internet usage.

5. A method according to claim 1 wherein the communication signals are radio frequency communication signals.

6. A method according to claim 5 wherein the communication signals are mobile phone signals.

7. A method according to claim 1 wherein the enclosure is a single family dwelling.

8. A method according to claim 1 further comprising controlling an HVAC system for the enclosure based at least in part on the probability that occupants of the enclosure will depart from or arrive at the enclosure at a certain time of the day based on the pre-existing model of occupancy patterns.

9. A method according to claim 1 further comprising controlling an HVAC system for the enclosure based at least in part on the probability that occupants of the enclosure will depart from or arrive at the enclosure at a certain time of the day based on the revised model of occupancy patterns.

10. A method according to claim 1 wherein the communication signals are monitored for patterns which indicate a likelihood of occupancy.

11. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, sound pressure information which indicates a likelihood of occupancy of the enclosure ranging from not occupied to occupied;

revising the model of occupancy patterns based at least in part on the monitored pressure information; and determining a probability that occupants of the enclosure will depart from or arrive at the enclosure at a certain time of the day based on the revised model of occupancy patterns, wherein the pre-existing model is generated based on a type of information other than the monitored pressure information.

12. A method according to claim 11 wherein the sound pressure monitored is in the audible range.

13. A method according to claim 12 wherein the types of sounds monitored include one or more types selected from a group consisting of: footsteps, voices, and doors closing.

14. A method according to claim 11 wherein the sound pressure monitored is in the ultrasonic range.

15. A method according to claim 14 wherein the types of sounds monitored include one or more types selected from a group consisting of footsteps, and air movement due to human movement.

16. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, utility information for the enclosure which indicates a likelihood of occupancy of the enclosure ranging from not occupied to occupied;

revising the model of occupancy patterns based at least in part on the monitored utility information; and determining a probability that occupants of the enclosure will depart from or arrive at the enclosure at a certain time of the day based on the revised model of occupancy patterns, wherein the pre-existing model is generated based on a type of information other than the monitored utility information.

17. A method according to claim 16 wherein the utility information is powerline information, and the powerline information is filtered to detect the use of electronic devices which indicate a likelihood of occupancy in the enclosure.

18. A method according to claim 16 wherein the utility information is obtained from a Smart Meter that tends to indicate a likelihood of occupancy in the enclosure.

19. A method according to claim 18 wherein pattern recognition is used to monitor changes in the utility information from a baseline to detect likelihoods of occupancy of the enclosure.

20. A method according to claim 16 wherein the enclosure is a dwelling.

21. A system for detecting occupancy of an enclosure comprising:

a processing system adapted to determine a probability that occupants of the enclosure will depart from or arrive at the enclosure at a certain time of the day based on a pre-existing model of occupancy patterns, the pre-existing model being available to the processing system at the time of installation of the processing system in the enclosure, the model being indicative of a probability that occupants of the enclosure will depart from and arrive at the enclosure at certain times over the course of a day; and a sensing system adapted to monitor, after installation of the sensing system in the enclosure, utility information for the enclosure which indicates a likelihood of occupancy of the enclosure ranging from not occupied to occupied;

the processing system being further adapted to revise the model of occupancy patterns based at least in part on the monitored utility information by the sensing system, and to determine a probability that occupants of the enclosure will depart from or arrive at the enclosure at a certain time of the day based on the revised model of occupancy patterns, wherein the pre-existing model is generated based on a type of information other than the monitored utility information.

22. A system according to claim 21 wherein the utility information is powerline information, and the powerline information is filtered to detect the use of electronic devices which indicate a likelihood of occupancy in the enclosure.

23. A system according to claim 21 wherein the utility information is obtained from a Smart Meter that tends to indicate a likelihood of occupancy in the enclosure.

24. A system according to claim 23 wherein pattern recognition is used by the processing system to monitor changes in the utility information from a baseline to detect likelihoods of occupancy of the enclosure.

25. A system according to claim 21 wherein the enclosure is a dwelling.

26. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, motion information from a sensor;

revising the model of occupancy patterns based at least in part on the monitored motion information; and determining a probability that occupants of the enclosure will depart from or arrive at the enclosure at a certain time of the day based on the revised model of occupancy patterns, wherein the pre-existing model is generated based on a type of information other than the monitored motion information.

27. A method according to claim 26 wherein the sensor is an accelerometer and the motion information is acceleration information monitored within one meter of the sensor.

28. A method according to claim 26, further comprising preparing a device for interaction with a user based on the monitored motion information.

29. A method according to claim 26 wherein the enclosure is a small dwelling.

30. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, infrared signals within the enclosure which indicate operation of one or more infrared controllable devices;

revising the model of occupancy patterns of the enclosure based at least in part on the monitored infrared signals; and determining a probability that occupants of the enclosure will depart from or arrive at the enclosure at a certain time of the day based on the revised model of occupancy patterns, wherein the pre-existing model is generated based on a type of information other than the monitored infrared signals.

31. A method according to claim 30 wherein the infrared signals indicate remote control of one or more electronic devices by an occupant.

32. A method according to claim 30 wherein the enclosure is a dwelling.

33. A system for detecting occupancy of an enclosure comprising:

a processing system adapted to determine a probability that occupants of the enclosure will depart from or arrive at the enclosure at a certain time of the day based on a pre-existing model of occupancy patterns, the pre-existing model being available to the processing system at the time of installation of the processing system in the enclosure, the model being indicative of a probability that occupants of the enclosure will depart from and arrive at the enclosure at certain times over the course of a day; and an infrared sensor adapted to monitor, after installation of the infrared sensor in the enclosure, infrared signals within the enclosure which indicate operation of one or more infrared controllable devices;

the processing system being further adapted to revise the model of occupancy patterns based at least in part on the monitored infrared signals by the infrared sensor, and to determine a probability that occupants of the enclosure will depart from or arrive at the enclosure at a certain time of the day based on the revised model of occupancy patterns, wherein the pre-existing model is generated based on a type of information other than the monitored infrared signals.

34. A system according to claim 33 wherein the infrared signals indicate remote control of one or more electronic devices by an occupant.

35. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, pressure information within the enclosure which indicates occupancy of the enclosure;

revising the model of occupancy patterns based at least in part on the monitored pressure information; and determining a probability that occupants of the enclosure will depart from or arrive at the enclosure at a certain time of the day based on the revised model of occupancy patterns, wherein the pre-existing model is generated based on a type of information other than the monitored pressure information.

36. A method according to claim 35 wherein the pressure information includes change in atmospheric pressure in the enclosure that indicate opening of doors and/or windows.

37. A method according to claim 35 wherein the enclosure is a dwelling.

38. A system for detecting occupancy of an enclosure comprising:

a processing system adapted to determine a probability that occupants of the enclosure will depart from or arrive at the enclosure at a certain time of the day based on a pre-existing model of occupancy patterns, the pre-existing model being available to the processing system at the time of installation of the processing system in the enclosure, the model being indicative of a probability that occupants of the enclosure will depart from and arrive at the enclosure at certain times over the course of a day; and a pressure sensor adapted to monitor, after installation of the pressure sensor in the enclosure, pressure information within the enclosure which indicates occupancy of the enclosure;

the processing system being further adapted to revise the model of occupancy patterns based at least in part on the monitored pressure information by the pressure sensor, and to determine a probability that occupants of the enclosure will depart from or arrive at the enclosure at a certain time of the day based on the revised model of occupancy patterns, wherein the pre-existing model is generated based on a type of information other than the monitored pressure information.

39. A system according to claim 38 wherein the pressure information includes change in atmospheric pressure in the enclosure that indicate opening of doors and/or windows.

40. A method for detecting occupancy of an enclosure comprising:

determining a probability that occupants of the enclosure will depart from or arrive at the enclosure at a certain time of the day based on a pre-existing model of occupancy patterns, the pre-existing model being available to a thermostat at the time of installation of the thermostat in the enclosure, the model being indicative of a probability that occupants of the enclosure will depart from and arrive at the enclosure at certain times over the course of a day;

monitoring, by the thermostat after installation of the thermostat in the enclosure, ambient light information within the enclosure which indicates occupancy of the enclosure;

revising the model of occupancy patterns based at least in part on the monitored ambient light information; and determining a probability that occupants of the enclosure will depart from or arrive at the enclosure at a certain time of the day based on the revised model of occupancy patterns, wherein the pre-existing model is generated based on a type of information other than the monitored ambient light information.

41. A method according to claim 40 wherein the ambient light information includes rapid changes in ambient light in the enclosure that tends to indicate switching on and off of lights or sudden opening or closing of blinds and/or curtains.

42. A method according to claim 40 wherein the ambient light information includes wavelength composition of incident light that tends to indicate whether the light source is artificial or natural.

43. A method according to claim 40 wherein the enclosure is a dwelling.

44. A system for detecting occupancy of an enclosure comprising:

a processing system adapted to determine a probability that occupants of the enclosure will depart from or arrive at the enclosure at a certain time of the day based on a pre-existing model of occupancy patterns, the pre-existing model being available to the processing system at the time of installation of the processing system in the enclosure, the model being indicative of a probability that occupants of the enclosure will depart from and arrive at the enclosure at certain times over the course of a day; and an ambient light sensor adapted to monitor, after installation of the ambient light sensor in the enclosure, ambient light information within the enclosure which indicates occupancy of the enclosure;

the processing system being further adapted to revise the model of occupancy patterns based at least in part on the monitored ambient light information by the ambient light sensor, and to determine a probability that occupants of the enclosure will depart from or arrive at the enclosure at a certain time of the day based on the revised model of occupancy patterns, wherein the pre-existing model is generated based on a type of information other than the monitored ambient light information.

45. A system according to claim 44 wherein the ambient light information includes rapid changes in ambient light in the enclosure that tends to indicate turning on and off of lights or opening and closing of blinds and/or curtains.

46. A system according to claim 44 wherein the ambient light information includes whether ambient light is from artificial source that tends to indicate presence of occupants in certain structure types.

* * * * *